(12) United States Patent
Quigley et al.

(10) Patent No.: US 6,918,481 B2
(45) Date of Patent: *Jul. 19, 2005

(54) DISCHARGE CHUTE FOR CONCRETE

(75) Inventors: Thomas P. Quigley, Oshkosh, WI (US); Scott L. Steckling, Appleton, WI (US); Troy R. Scott, Van Dyne, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,271

(22) Filed: Mar. 28, 2003

(65) Prior Publication Data

US 2003/0226737 A1 Dec. 11, 2003

Related U.S. Application Data

(63) Continuation of application No. 09/713,744, filed on Nov. 15, 2000.

(51) Int. Cl.[7] .............................................. B65G 11/00
(52) U.S. Cl. .................. 193/6; 193/5; 193/4; 193/2 R; 193/33
(58) Field of Search ............................ 193/6, 5, 4, 2 R, 193/33

(56) References Cited

U.S. PATENT DOCUMENTS

| | | | |
|---|---|---|---|
| 4,054,194 A | 10/1977 | Davis | 193/10 |
| 5,184,706 A | 2/1993 | Christenson | 193/2 R |
| 5,244,069 A | 9/1993 | Cosgrove | 193/5 |
| D364,028 S | 11/1995 | Rouleau | D34/35 |
| 6,041,906 A | 3/2000 | Howard | 193/2 R |
| 6,367,606 B1 | 4/2002 | Skalla et al. | 193/6 |

*Primary Examiner*—Donald P. Walsh
*Assistant Examiner*—Jeffrey A. Shapiro
(74) *Attorney, Agent, or Firm*—Foley & Lardner LLP

(57) ABSTRACT

A light weight but strong extension chute for discharging concrete from a concrete transportation vehicle or a cement mix plant. An extension concrete chute comprising a chute assembly including a frame having a first end and a second end, with each end including an arcuate end angle member maintained in a spaced apart relationship by a pair of chute rails attached to each end angle member. The chute assembly also includes a chute skin mounted within the frame and attached to each chute rail and each end angle member, wherein the chute assembly defines a longitudinally elongated concave chute. A removable liner is mounted within the chute assembly adjacent to the chute skin. Each chute rail is provided with a hook mounted on each chute rail proximate the second end of the chute assembly and a bracket assembly mounted on each chute rail proximate the first end of the chute assembly.

12 Claims, 8 Drawing Sheets

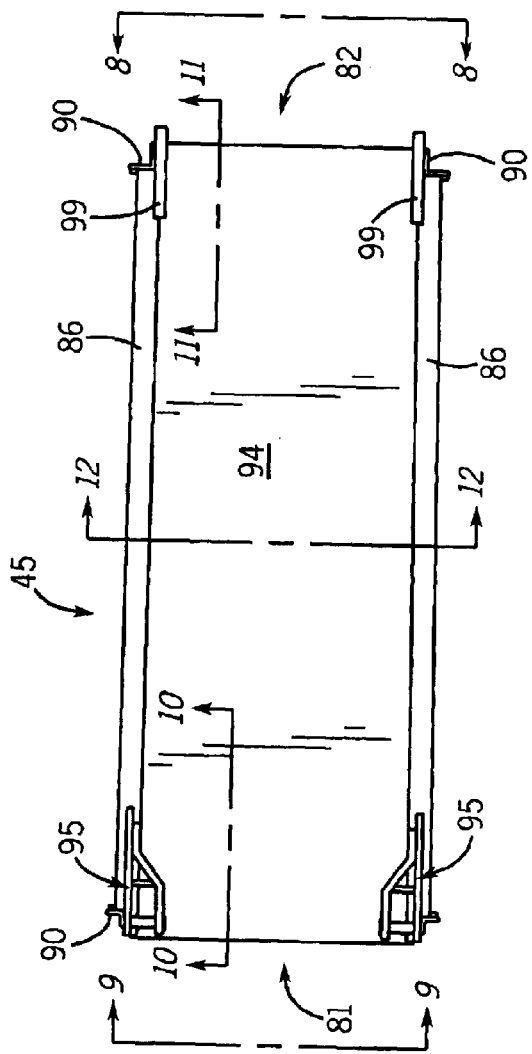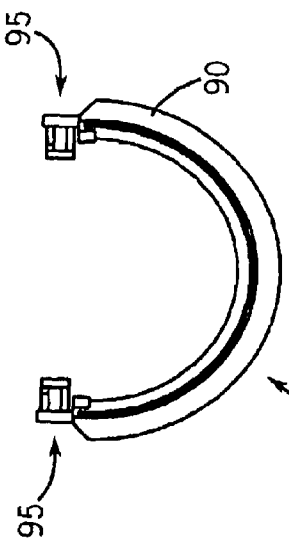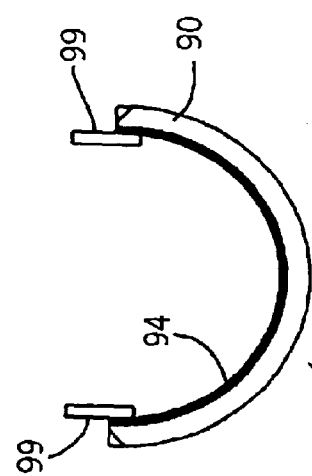

DISCHARGE CHUTE FOR CONCRETE

CROSS-REFERENCE TO RELATED PATENT APPLICATIONS

This application is a continuation application of application Ser. No. 09/713,744, filed Nov. 15, 2000, entitled DISCHARGE CHUTE FOR CONCRETE, which is incorporated herein.

FIELD OF THE INVENTION

The present invention relates to a discharge chute for concrete transport vehicles. In particular, the present invention relates to a concrete discharge chute with a removable plastic lining.

BACKGROUND OF THE INVENTION

Concrete vehicles or trucks are commonly employed in construction to mix, transport and pour concrete. They can be a rear discharge concrete vehicles or a front discharge concrete vehicle. The front discharge concrete vehicle includes a drum with an outlet generally supported above a cab enclosure of the vehicle to enable concrete to be discharged and poured through a chute extending forward the vehicle. Because the vehicle discharges concrete at its forward end, the vehicle is better able to supply concrete to locations having limited access. Concrete can also be mixed and poured from stationary facilities, typically referred to as a concrete mixing plants.

Existing concrete chutes used with concrete transport vehicles or with stationary concrete mixing plants, are typically made of steel with and without reinforcing members. Such chutes are heavy and difficult to manipulate. Also, chutes associated with cement trucks and cement plants are subject to a great deal of wear and tear not only by the impact and abrasion resulting from the movement of the concrete or other fluent materials, but also by the impact of other machinery and equipment. In response to such conditions, chutes have been developed that have a liner attached in the chute to ameliorate the abrasion and impact conditions experienced by the chute during their use. Prior art devices typically will bolt or otherwise fasten the liner to the chute in order to maintain the liner within the chute throughout the chute's operational positions. Problems continue to exist, however, in that the fasteners wear as the concrete moves over the fasteners, and the fasteners are subject to corrosion and rust either from the chemical composition of the concrete or from the fluids used to clean the chutes such as water and hydrochloric acid. Other prior art liners have been laminated to the chute in order to avoid the wear and corrosion of hardware described above. However, the laminated liners, experience different thermal expansion characteristics which causes stress and cracks that allows concrete and other fluent materials to attack the chute. Also, laminated liners cannot be easily replaced or repaired and typically a new chute is required. Other prior art chutes composed of materials other than metal and with or without liners have also been used. However, such chutes are not as resilient to the conditions they are exposed to and further cracking and breaking requires replacement of the entire chute.

Thus, there is a need for a light weight but strong extension concrete chute for use with concrete transportation vehicles or cement mix plants. There is further need for an extension concrete chute with a liner that is not fastened to the chute with fasteners nor laminated to the chute. There is an additional need for an extension concrete chute that supports a removable liner that can be easily replaced.

SUMMARY OF THE INVENTION

There is provided a light weight but strong extension chute for discharging concrete from a concrete transportation vehicle or a cement mix plant. An extension concrete chute comprising a chute assembly including a frame having a first end and a second end, with each end including an arcuate end angle member maintained in a spaced apart relationship by a pair of chute rails attached to each end angle member. The chute assembly may also include a chute skin mounted within the frame and attached to each chute rail and each end angle member, wherein the chute assembly defines a longitudinally elongated concave chute. A removable liner is mounted within the chute assembly. Each chute rail is provided with a hook mounted on each chute rail proximate the second end of the chute assembly and a bracket assembly mounted on each chute rail proximate the first end of the chute assembly. The chute rails are configured to releaseably engage and support the liner. The extension chute can also be provided with an elongated channel attached to each end angle member underneath the extension chute. The chute rails can also be configured in conjunction with a liner flange to form a liner pocket to receive the liner and removably retain the liner within the extension chute.

The features which characterize the invention are pointed out with particularity in the claims annexed hereto and forming a part hereof. However, for a better understanding of the invention, reference should be made to the drawings which form a part hereof and to the descriptive material, in which there is illustrated and described several exemplary embodiments of the invention.

BRIEF DESCRIPTION OF THE DRAWINGS

FIG. 7 is a top plan view of an examplary embodiment of a concrete chute removably supporting a plastic liner.

FIG. 8 is an end view of the concrete chute illustrated in FIG. 7 along the lines 8—8.

FIG. 9 is an end view of the concrete chute illustrated in FIG. 7 along the lines 9—9.

FIG. 13 is an enlarged perspective view of the hook and chute rail engaging the liner.

DETAILED DESCRIPTION OF THE EXAMPLARY EMBODIMENTS

Figure 1:
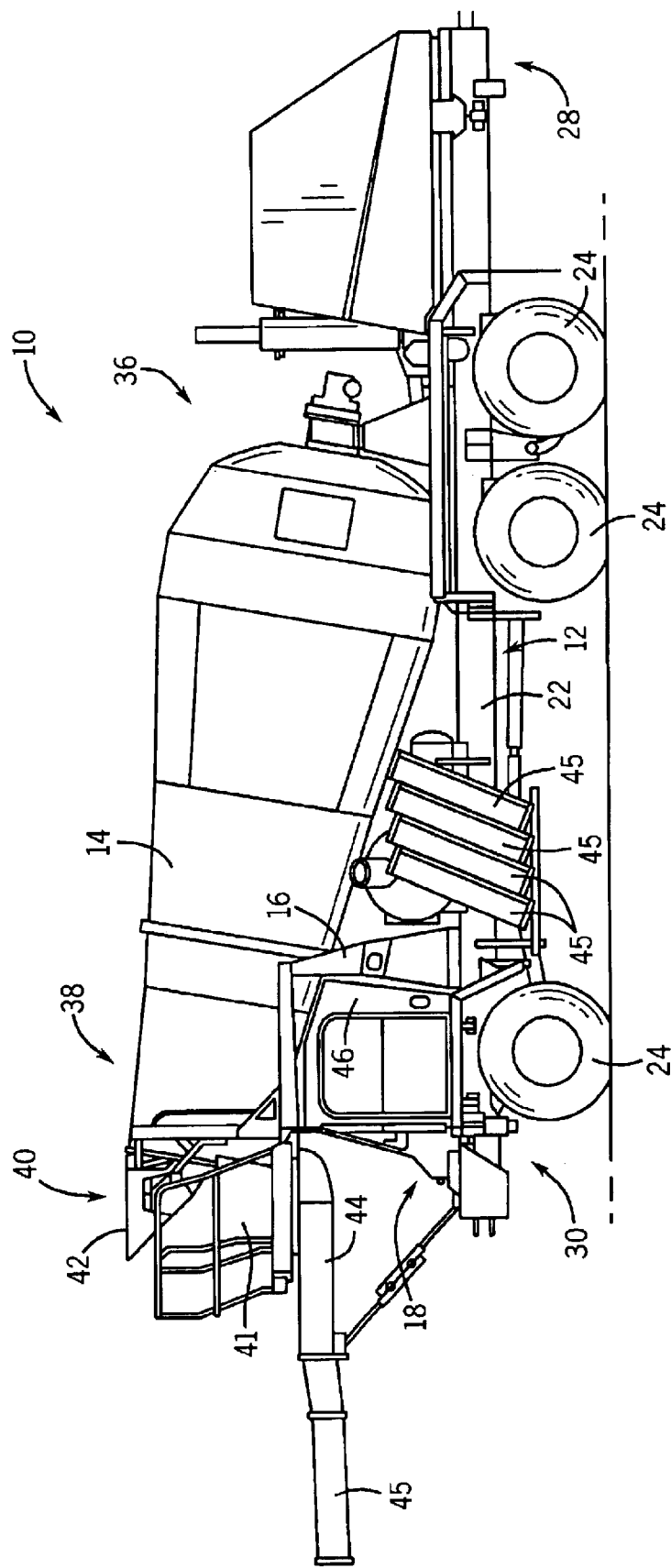
FIG. 1 is a side plan view of a front discharge concrete vehicle including an exemplary embodiment of a concrete chute having a plastic liner.
Figure 2:
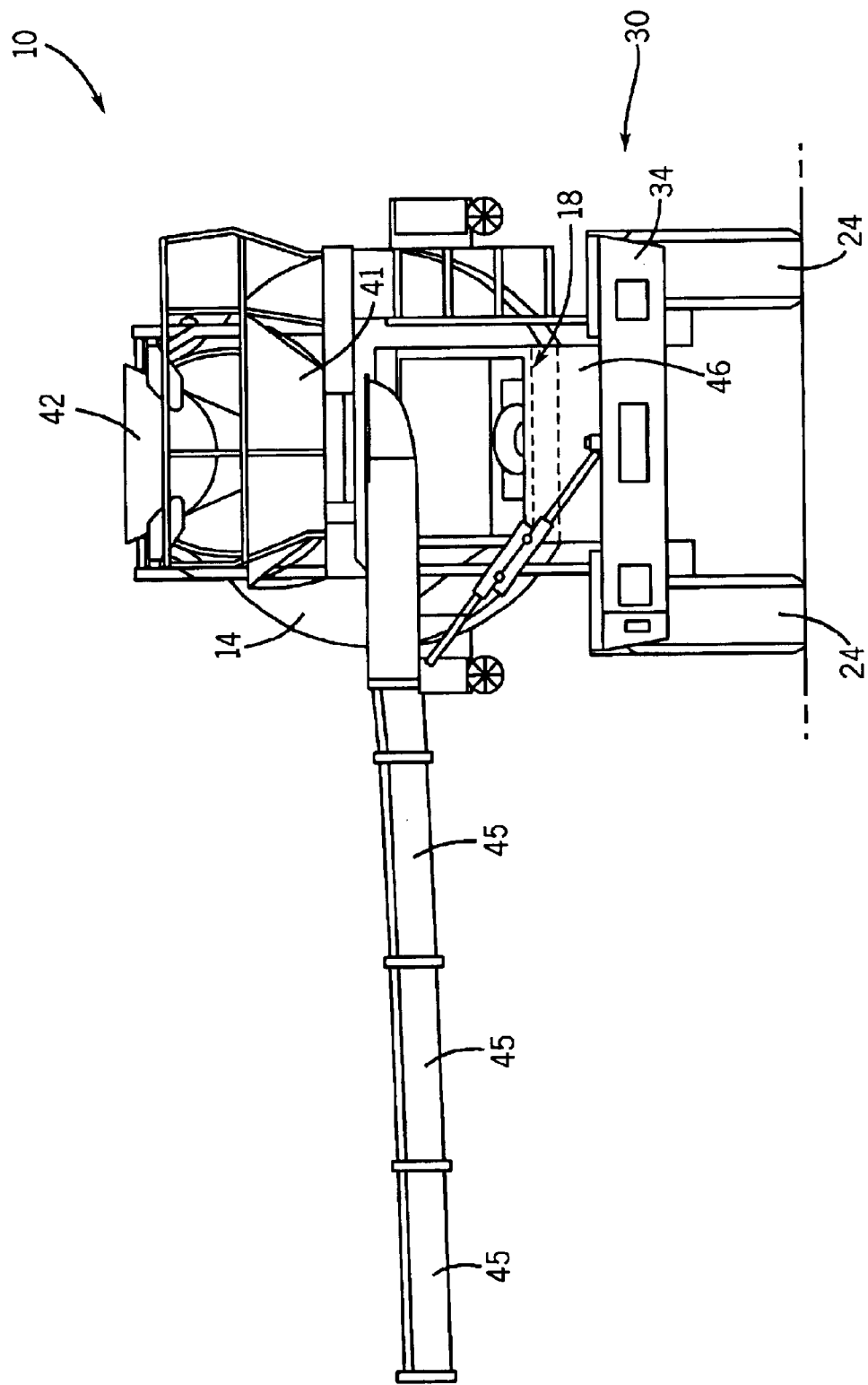
FIG. 2 is a front view of a front discharge concrete vehicle including an examplary embodiment of a concrete chute having a plastic liner.

FIGS. 1 and 2 are views of a front discharge concrete transport vehicle 10 configured to mix, transport and pour concrete. Vehicle 10 generally includes chassis 12, mixing drum 14, pedestal 16, and cab enclosure 18. Chassis 12 supports mixing drum 14, pedestal 16, cab enclosure 18 and conventionally known engine, transmission and hydraulic systems (not shown) of vehicle 10. Chassis 12 includes frame 22 and wheels 24. Frame 22 extends from a rear end 28 to a front end 30 of vehicle 10 and is coupled to wheels 24. Frame 22 provides a structural base for supporting drum 14, pedestal 16 and chassis 18. Frame 22 includes a widened front portion 34 which extends over and about forward most wheels 24 to simultaneously support cabin enclosure 18 and to serve as a fender for the forward most wheels 24. Frame 22 is preferably formed from heat treated carbon manganese steel.

Wheels 24 moveably support frame 22 above the ground or terrain. As will be appreciated, wheels 24 may be replaced by other ground engaging motive members such as tracks.

Mixing drum 14 is conventionally known and is supported by frame 22 of chassis 12. Drum 14 has a first end 36 towards rear 28 and a second end 38 towards front 30 of vehicle 10. Second end 38 extends above cab enclosure 18 and includes an opening 40 through which concrete is emptied from drum 14 into the discharge hopper 41 and main chute 44 as well as extension chutes 45 (shown connected to the main chute 44), for distribution of concrete forward front 30 of vehicle 10. Drum 14 is rotated in a conventionally known manner to mix concrete until being emptied through opening 40 into discharge hopper 41 and chute 44. Because opening 40, discharge hopper 41 and chute 44 extend above cab enclosure 18 and forward front end 30 of vehicle 10, concrete vehicle 10 is better able to supply concrete to hard to reach and otherwise inaccessible locations.

Pedestal 16, also known as a support post or support column, comprises part of the super structure of vehicle 10 and extends between frame 22 of chassis 12 and end 38 of drum 14. Pedestal 16 supports end 38 of drum 14 above cab enclosure 18.

Cab enclosure 18 includes housing 46 supported by frame 22 of chassis 12 below end 38 of drum 14.

Figure 3:
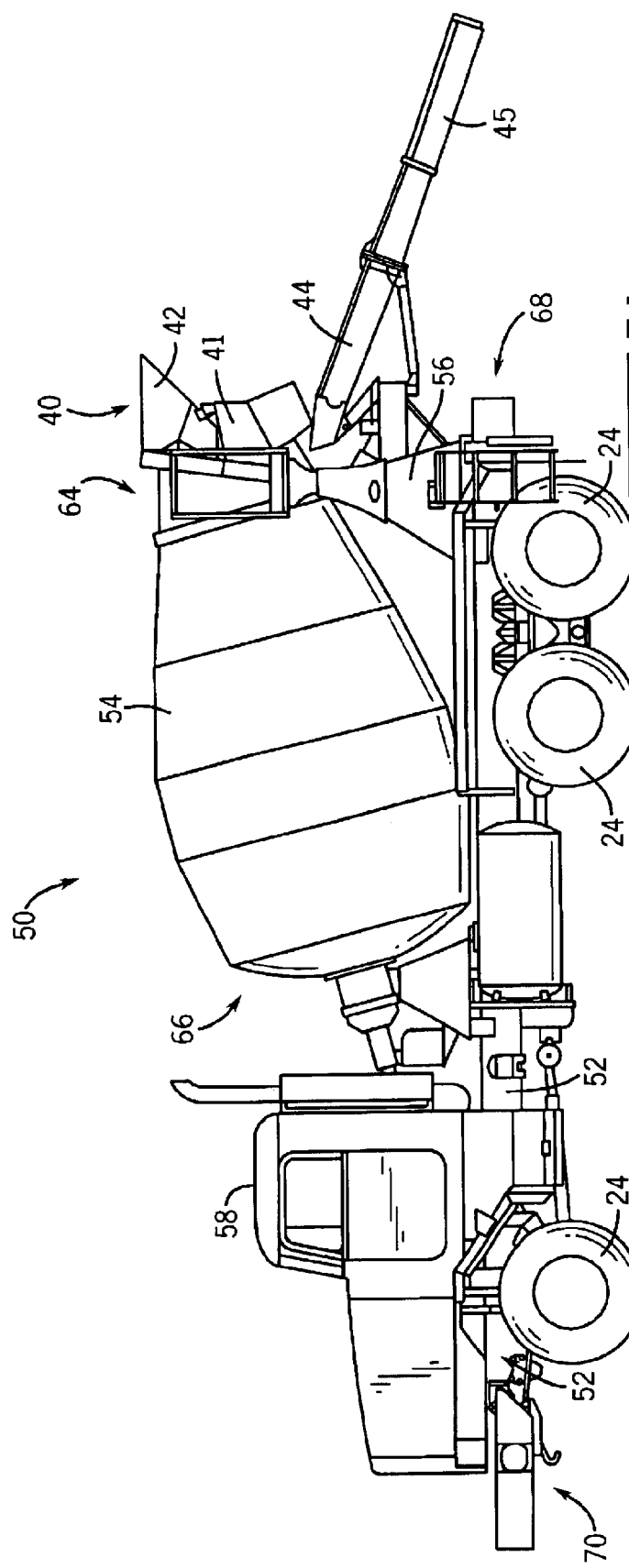
FIG. 3 is a is a side plan view of a rear discharge concrete vehicle including an examplary embodiment of a concrete chute having a plastic liner.
Figure 4:
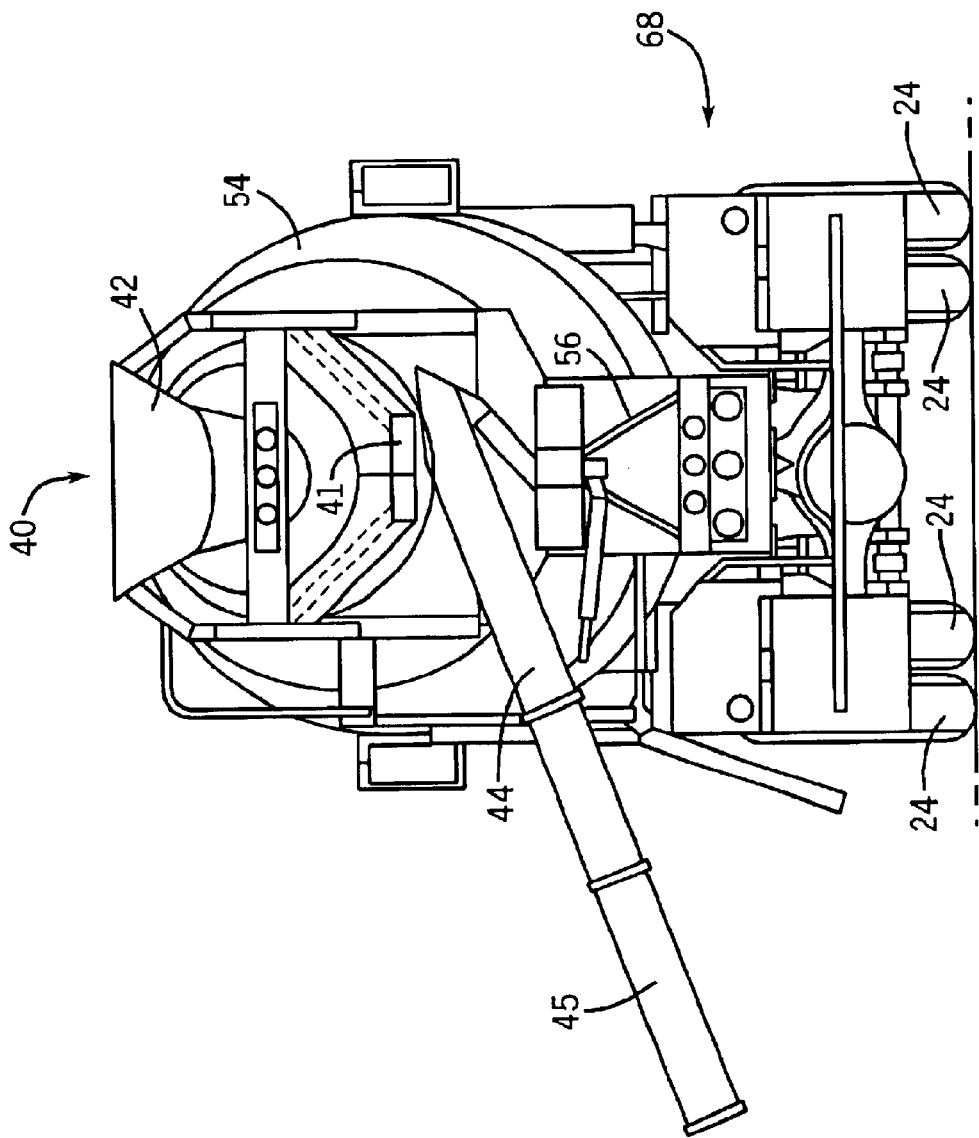
FIG. 4 is a rear view of a rear discharge concrete vehicle including an examplary embodiment of a concrete chute having a plastic liner.
Figure 5:
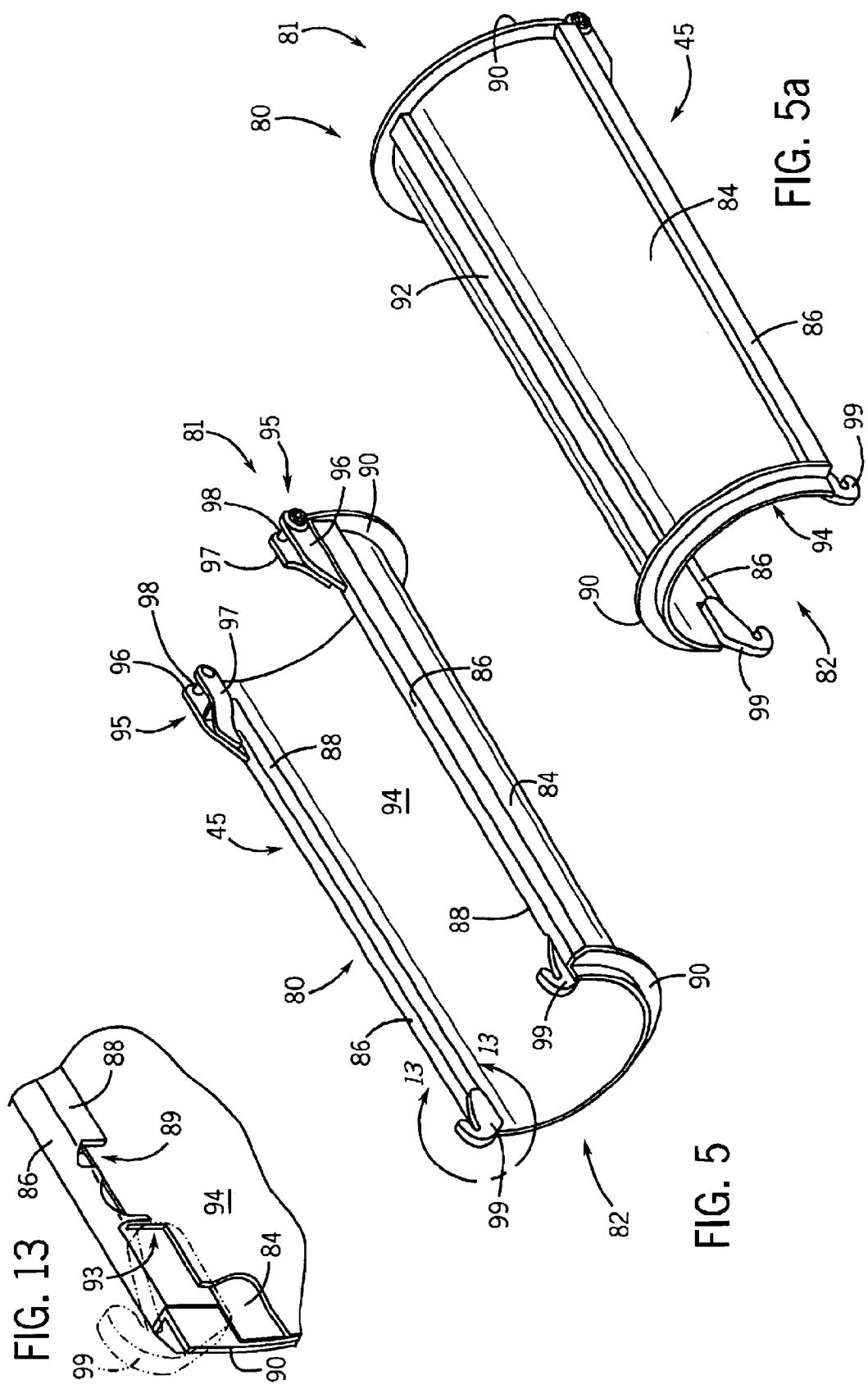
FIG. 5 is a perspective view of an examplary embodiment of a concrete chute supporting a plastic liner.

FIGS. 3 and 4 are views of a rear discharge concrete transport vehicle 50 configured to mix, transport and pour concrete. Vehicle 50 generally includes chassis 52, mixing drum 54, pedestal 56, and cab enclosure 58. Chassis 52 supports mixing drum 54, pedestal 56, cab enclosure 58 conventionally known engine, transmission and hydraulic systems (not shown) of vehicle 50. Chassis 52 includes frame 62 and wheels 24. Frame 62 extends from a rear end 68 to a front end 70 of vehicle 50 and is coupled to wheels 24. Frame 62 provides a structural base for supporting drum 54, pedestal 56 and chassis 58. Frame 62 is preferably formed from heat treated carbon manganese steel.

Wheels 24 moveably support frame 62 above the ground or terrain. As will be appreciated, wheels 24 may be replaced by other ground engaging motive members such as tracks.

Mixing drum 54 is conventionally known and is supported by frame 62 of chassis 52. Drum 54 has a first end 64 towards rear 68 and a second end 66 towards front 70 of vehicle 50. Second end 66 includes an opening 40 through which concrete is emptied from drum 54 into spout 42 and main chute 44 as well as extension chutes 45 (shown connected to the main chute 44), for distribution of concrete to rear 70 of vehicle 50. Drum 54 is rotated in a conventionally known manner to mix concrete until being emptied through opening 40 into discharge hopper 41 and chute 44.

Pedestal 56, also known as a support post or support column, comprises part of the super structure of vehicle 50 and extends between frame 62 of chassis 52 and end 64 of drum 54. Pedestal 56 supports end 64 of drum 54.

Cab enclosure 58 includes housing 59 supported by frame 62 of chassis 52 in front of end 66 of drum 54.

FIGS. 5–13 illustrate examplary embodiments of an extension chute 45 that supports a removable liner 94. Extension chutes typically are attached to a main chute 44 of a concrete delivery system. The delivery system can be of the type of vehicles described above or it can be at a stationary concrete mixing plant. More than one extension chute can be sequentially mounted to extend the delivery chute for placement of the wet concrete as it leaves the mixing drum of a concrete delivery system.

An extension chute 45 is operatively aligned with the main chute 44 with the extension chute 45 comprising a chute assembly 80 which includes a frame having a first end 81 and a second end 82, with each end including an arcuate end angle member 90 which are maintained in a spaced apart relationship by a pair of chute rails 86 attached to each end angle member 90. Mounted inside the frame to form a longitudinally elongated concave chute is a chute skin 84 which is attached to each chute rail 86 and each end angle member 90. The chute skin can be mounted to the frame in any convenient manner such as welding. The chute skin 84 is aligned with each chute rail 86 along its entire longitudinal length. The attachment method however, may be at selected intervals along such length as is appropriate for the type of materials composing the chute skin 84 and the chute rails 86 and the end angle members 90. The extension chute 45 also includes a removable liner 94 mounted within the chute assembly 80 adjacent to the chute skin 84.

One embodiment of the extension chute 45 includes a hook 99 mounted on each chute rail 86 proximate the second end 82 of the chute assembly 80 and a bracket assembly 95 mounted on each chute rail 86 proximate the first end 81 of the chute assembly 80. The bracket assembly 95 includes a first side portion 96 and a second side portion 97 with each side portion supporting an attachment pin 98. In operation, a hook 99 on the downstream end of the chute engages the attachment pin 98 to secure an extension chute 45 to the prior chute member. In this manner, any number of extension chutes 45 can be mounted to each other as is deemed necessary by an operator of the cement delivery system. In the typical arrangement, three or four extension chutes are utilized at any given time. Additional extension chutes can be stored on the vehicle 10 as shown in FIG. 1.

In order to provide a lighter extension chute 45 and a more manageable extension chute 45 when used for the delivery of concrete, the chute assembly 80 is composed of aluminum. Each chute rail 86, each end angle member 90 and the chute skin 84 are composed of aluminum. For additional strength, one embodiment of the extension chute 45 includes an elongated channel 92 attached to each end angle member 90 and to the chute skin 84. This dorsal channel 92 is mounted underneath the extension chute 45 and provides bending moment strength as well as tortional force resistance. The dorsal channel 92 is also composed of aluminum. Applicants contemplate that the chute assembly 80 which includes the frame comprising the end angle members 90 and the chute rails 86, the dorsal channel 92 and the chute skin 84 can also be composed of an engineered plastic with appropriate strength and reinforcement to support the weight of fluid concrete.

Figure 6:
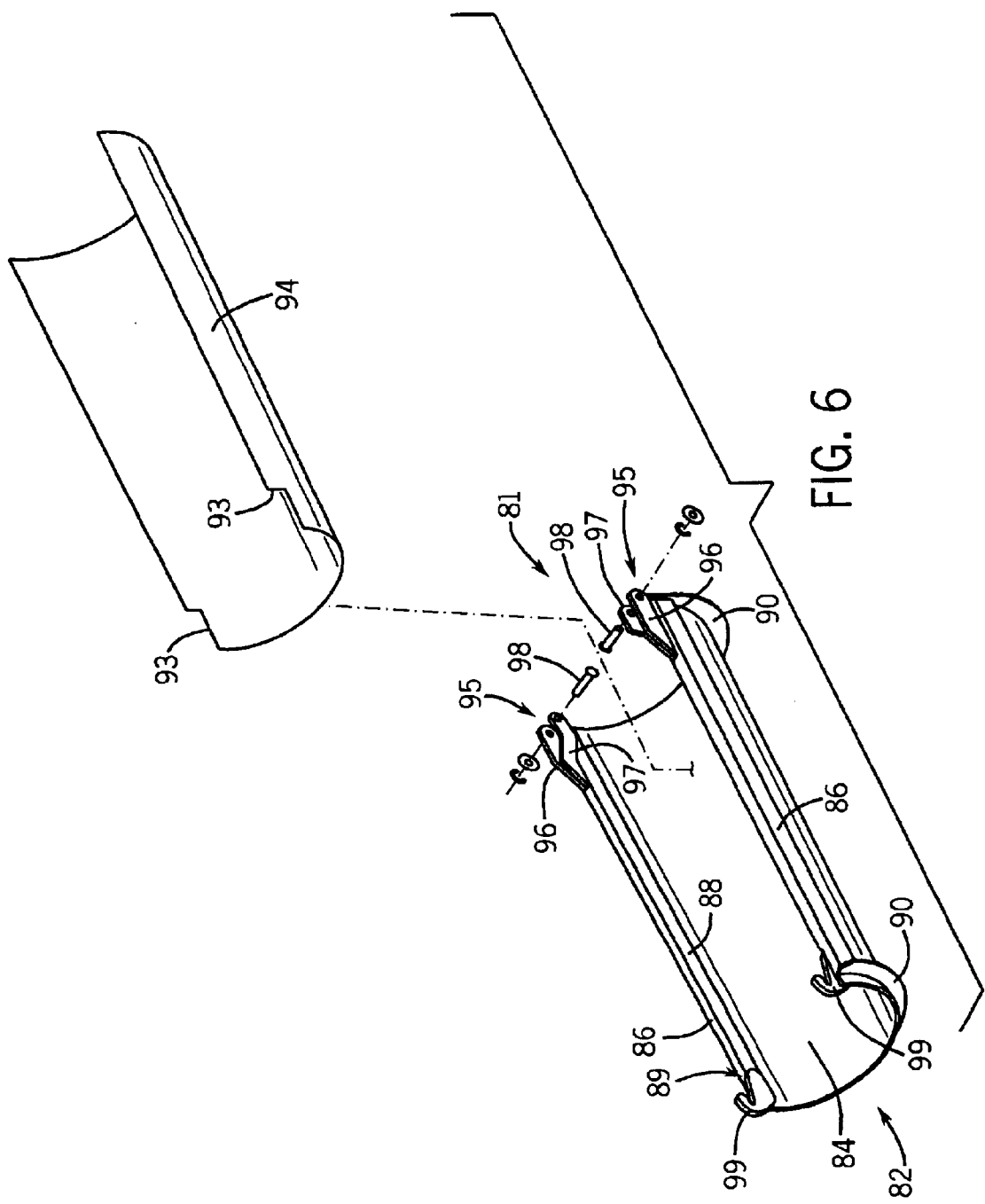
FIG. 6 is a an exploded perspective view of an examplary embodiment of a concrete chute and a plastic liner.
Figure 11:
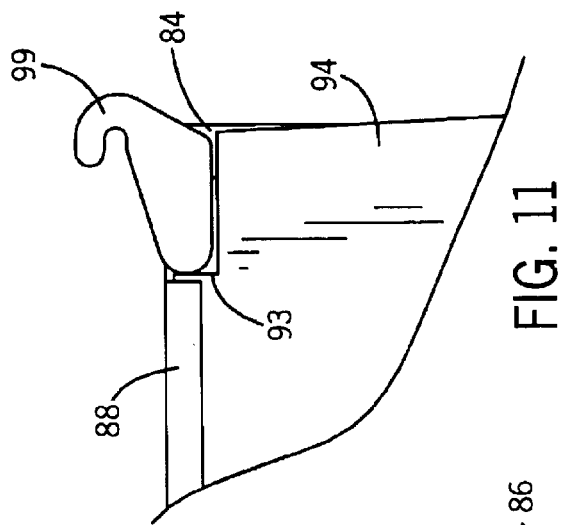
FIG. 11 is a partial interior side view of the concrete chute illustrated in FIG. 7 along the lines 11—11.
Figure 12:
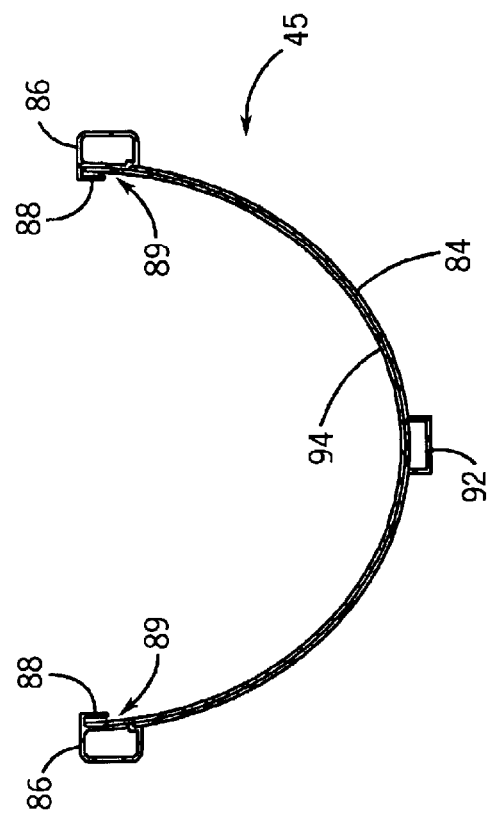
FIG. 12 is a sectional view of the concrete chute illustrated in FIG. 7 along the lines 12—12.
Figure 10:
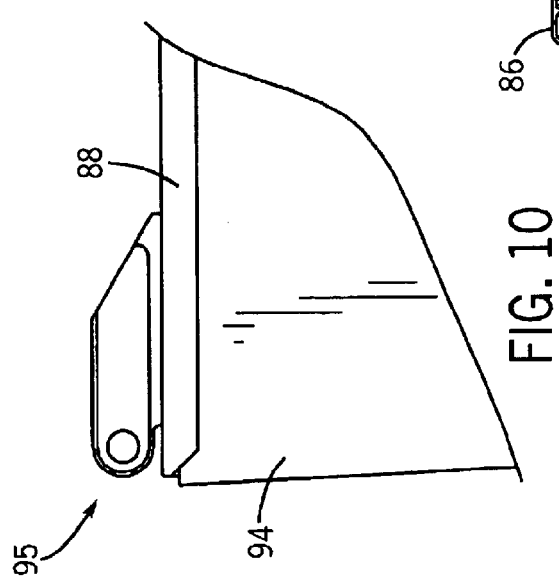
FIG. 10 is a partial interior side view of the concrete chute illustrated in FIG. 7 along the lines 10—10.

The removable liner 94 is mounted within the chute assembly 80 adjacent to the chute skin 84. The chute rails 86 are each configured, in conjunction with a liner flange 88, to form a liner pocket 89 to receive the liner 94 and removably retain the liner 94 within the chute assembly 80 of the extension chute 45. Another embodiment of the extension chute 45 provides that each chute rail 86 and liner flange 88 are composed of the same material and form a single, integral member. (See FIG. 12) It is also contemplated that the liner pocket 89 is not continuous along the entire length of the chute rail 86 but rather forms a plurality of liner pockets 89 in a spaced apart relationship along the length of the chute rail 86. In any case, the liner pocket 89 releasably engages the removable liner 94 and provides for it to be slid along the length of the chute rail 86. The removable liner 94, preferably composed of plastic such as polyethylene and particularly ultra-high molecular weight polyethylene with an ultra-violet light inhibitor, is a flat, trapezoidal shaped sheet having a uniform cross section. A preferred embodiment of the removable plastic liner has a substantially uniform thickness of approximately one-eighth (⅛) inch. As seen in FIG. 6, the liner 94 must be bent in a u-shaped aspect along its longitudinal length. The liner 94 is orientated and aligned with each liner pocket 89 and inserted into the liner pocket 89 formed in each chute rail 86. The liner 94 is in the liner pocket until a notch 93 abuts against the hook 99 on each chute rail 86. The resiliency of the removable liner 94 in the bent u-shape biases the liner edges inside the chute pockets 89 and assists in retaining the removable liner 94 in the chute assembly 80. The liner 94 abutting against the hook 99 at the notch 93 prevents the liner 94 from sliding forward or downstream when the extension chute 45 is at an angle. Applicants have found that over time, the removable liner 94 will take on a semi-permanent u-shape as a result of being inserted inside the chute assembly 80 of the extension chute 45.

After a period of time of use of the extension chute 45, the removable liner 94 can be replaced by sliding the liner 94 out of the liner pocket 89 in each chute rail 86 and installing a new liner 94 into the liner pocket 89 of each chute rail 86 as previously described. Removal and replacement of the liner 94 can take place as a result of normal wear and tear on the liner, damage to the liner, or to facilitate the cleaning of the chute assembly 80 and the liner 94 with a liquid wash.

It should be appreciated that there has been provided a discharge chute for concrete that is lightweight but strong for use with concrete transportation vehicles or cement mix plants. It should also be understood that there is provided an extension chute for concrete with a removable liner that can be easily replaced. Although the extension chute has been described with reference to preferred embodiments, workers skilled in the art will recognize that changes may be made in form and detail without departing from the spirit and scope of the invention. The extension chute used for concrete is described with reference to the preferred embodiments and set forth in the following claims as manifestly intended to be as broad as possible.

What is claimed is:

1. A concrete chute with liner comprising:

a chute;

a pair of rail tubes, a single said rail tube being attached to each side of said chute, each said rail tube having an outstanding-lip on a side thereof; and a liner being inserted into said pair of rail tubes, said outstanding lip being sized to slidably receive a thickness of said liner;

a front flange being attached to a front of said chute;

a rear flange being attached to a rear of said chute;

a hook being attached to a front of each said rail tube, said hook having a slot formed therein, said liner having a pair of notches formed on a front end of said liner, each notch being sized to receive a single said hook, said pair of notches preventing said liner from sliding out from a front of said concrete chute; and a hook mount being attached to a rear of each said rail tube, said hook mount enabling at least two concrete chutes with liners to be attached end-to-end.

2. The concrete chute with liner of claim 1, further comprising:

said hook mount including a first side wall, a second side wall, and a retention pin, one end of said first and second side walls being attached to each other, said retention pin being attached to the other ends of said first and second side walls, said retention pin being sized to receive said slot of said hook.

3. The concrete chute with liner of claim 1, further comprising:

a support channel being attached to a bottom of said chute, said support channel increasing the rigidity of the chute.

4. A concrete chute with liner comprising:

a chute;

a pair of rail tubes, a single said rail tube being attached to each side of said chute;

a liner being inserted into said pair of rail tubes;

a hook being attached to a front of each said rail tube, said hook having a slot formed therein, said liner having a pair of notches formed on a front end of said liner, each notch being sized to receive a single said hook; and a hook mount being attached to a rear of each said rail tube, said hook mount capable of receiving a single said hook.

5. The concrete chute with liner of claim 4, further comprising:

a front flange being attached to a front of said chute and a rear flange being attached to a rear of said chute.

6. The concrete chute with liner of claim 4, further comprising:

said hook mount including a first side wall, a second side wall, and a retention pin, one end of said first and second side walls being attached to each other, said retention pin being attached to the other ends of said first and second side walls, said retention pin being sized to receive said slot of said hook.

7. The concrete chute with liner of claim 4, further comprising:

a support channel being attached to a bottom of said chute, said support channel increasing the rigidity of the chute.

8. The concrete chute with liner of claim 4, further comprising:

each said rail tube having an outstanding lip on a side thereof, said outstanding lip being sized to slidably receive a thickness of said liner.

9. A concrete chute with liner comprising:

a chute;

a pair of rail tubes, a single said rail tube being attached to each side of said chute;

a liner being inserted into said pair of rail tubes;

a front flange being attached to a front of said chute;

a rear flange being attached to a rear of said chute;

a hook being attached to a front of each said rail tube, said hook having a slot formed therein, said liner having a pair of notches formed on a front end of said liner, each notch being sized to receive a single said hook; and a hook mount being attached to a rear of each said rail tube, said hook mount capable of receiving a single said hook.

10. The concrete chute with liner of claim 9, further comprising:

a front flange being attached to a front of said chute and a rear flange being attached to a rear of said chute.

11. The concrete chute with liner of claim 9, further comprising:

said hook mount including a first side wall, a second side wall, and a retention pin, one end of said first and second side walls being attached to each other, said retention pin being attached to the other ends of said first and second side walls, said retention pin being sized to receive said slot of said hook.

12. The concrete chute with liner of claim 9, further comprising:

each said rail tube having an outstanding lip on a side thereof, said outstanding lip being sized to slidably receive a thickness of said liner.

* * * * *